United States Patent [19]

Rode

[11] 3,768,307

[45] Oct. 30, 1973

[54] WELDING FLASH DETECTOR

[75] Inventor: Heinz A. Rode, Struthers, Ohio

[73] Assignee: Republic Steel Corporation, Cleveland, Ohio

[22] Filed: June 28, 1971

[21] Appl. No.: 157,407

[52] U.S. Cl. ............................................. 73/105
[51] Int. Cl. ........................................... G01b 19/32
[58] Field of Search .............................. 73/104, 105

[56] References Cited
UNITED STATES PATENTS

| | | | |
|---|---|---|---|
| 3,470,739 | 10/1969 | Takafuji et al. | 73/105 X |
| 3,329,011 | 7/1967 | Dereng | 73/105 |
| 2,518,663 | 8/1950 | Chaney et al. | 33/178 F |

Primary Examiner—Jerry W. Myracle
Attorney—Robert P. Wright et al.

[57] ABSTRACT

A welding flash detector mounted to a flash cutter carried by a cutting mandrel. As the work-piece, such as a pipe or conduit, passes along the cutting mandrel the detector monitors the operation of the cutting mandrel. The detector includes a pair of spaced reference rollers which straddle the weld seam and are biased into engagement with the work-piece. A sensing roller is positioned between the reference rollers and biased into engagement with the weld seam. A linear transducer senses the variation in relative position of the reference and sensing rollers and provides an electrical signal which is indicative of surface variations between the weld seam and adjacent work-piece portions.

23 Claims, 6 Drawing Figures

INVENTOR.
HEINZ A. RODE
BY
Watts, Hoffmann, Fisher & Heinke
ATTORNEYS

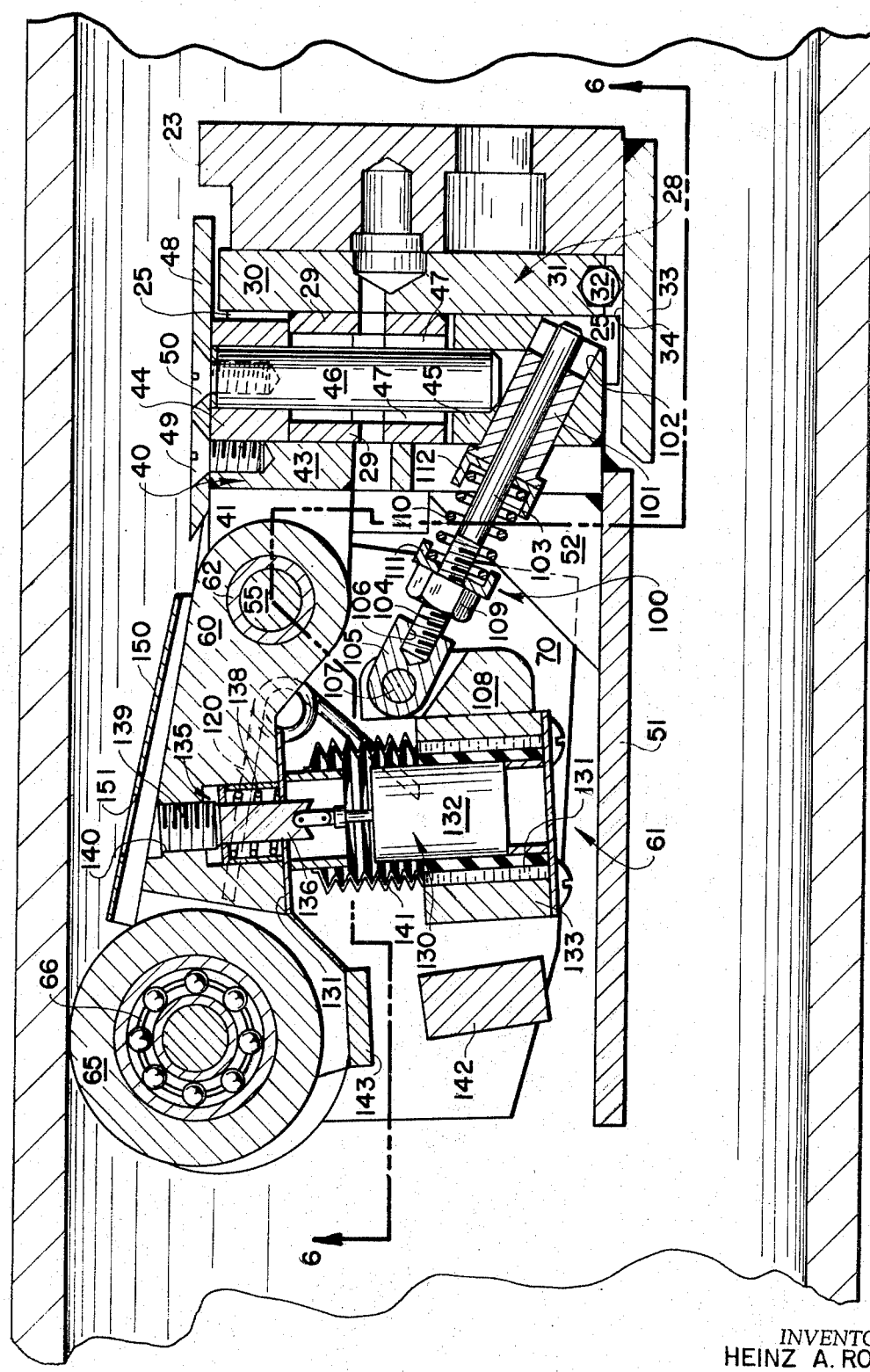

3,768,307

WELDING FLASH DETECTOR

BACKGROUND OF THE INVENTION

1. Field of the Invention

This invention pertains to the art of manufacturing pipe or the like and, more particularly, to apparatus for measuring variations in the surface of a pipe or other work-piece and controlling an operation performed thereon.

2. Prior Art

In the manufacture of pipe or conduit, it is often necessary to form the pipe by welding along a seam extending for the entire length of the pipe. After this welding step is performed, it is frequently necessary to pass the inside of the pipe over a cutter in order to remove the welding flash and generally smooth or trim the surface of the pipe along the welded seam. If the cutting mandrel is slightly out of adjustment, the cutting head may either trim too little of the welding flash or may cut too deeply into the welded seam. It is therefore desirable to provide a means for inspecting the trimmed weld to assure that the cutting mandrel is operating properly.

Since the information obtained by inspection of the trimmed weld is used to adjust the cutting mandrel, it is desirable to perform the inspection as nearly adjacent to the operation of the cutting mandrel as is possible. Where the inspection is performed visually, however, the pipe must first be cut into finite lengths. Due to the physical size of pipe production machinery and layout requirements for practical plant operation, the pipe cutting machinery is normally located a substantial distance from the pipe welding and weld trimming equipment. Hence, when defective pipe is being produced by an improperly adjusted weld flash cutter, several hundred feet of reject pipe may unfortunately be produced before visual detection will provide the information needed to correct the adjustment of the flash cutter.

A variety of devices adapted to test the inside surface of a pipe or conduit are well known. A substantial number of these devices employ ultrasonic detectors and the like which are not well adapted to ascertain whether a surface of a pipe being inspected, such as a weld bead is uniform and more specifically whether the depth of the weld is uniform with respect to surface portions on either side of it.

A number of other devices have been proposed to measure surface variations on the inside surface of a pipe. However, the operation of such proposed devices is frequently unfavorably affected by vibration as the devices are drawn through the pipe. Hence such devices were unsuitable for mounting on a cutting mandrel as a cutter control. Moreover, the surface variation measuring devices proposed by the prior art are not readily adjustable for use in conjunction with pipes of different gauges and diameters.

SUMMARY OF THE PRESENT INVENTION

The present invention provides an improved apparatus for inspection the trimmed weld along the interior of a pipe or conduit and for controlling the trimming of it.

In accordance with one aspect of the present invention; a detector is secured to and carried by the cutting mandrel used to trim weld flash from the interior of a pipe. By this arrangement, the detector is positioned in close proximity to the cutting mandrel ad provides an almost instantaneous indication of the operation of the cutting mandrel.

The detector includes a pair of reference rollers which are biased into engagement with the interior wall of the pipe in such fashion as to straddle the track of the trimmed weld. A sensing roller is positioned between the reference rollers and biased into engagement with the trimmed weld surface. A linear transducer senses the variation in relative position of the reference and sensing rollers and provides an electrical signal which is indicative of the depth of cut of the cutting mandrel. This electrical signal may then be used to adjust the cutting mandrel.

Accordingly, it is the principal object of the present invention to provide an improved welding flash detector mounted to a flash cutter for measuring surface variations between a trimmed weld seam and adjacent work-piece portions.

Other objects and a fuller understanding of the invention may be had by referring to the following description and claims taken in conjunction with the accompanying drawings.

BRIEF DESCRIPTION OF THE DRAWINGS

FIG. 4 is an elevational sectional view of the detector;

DESCRIPTION OF THE PREFERRED EMBODIMENT

Figure 1:
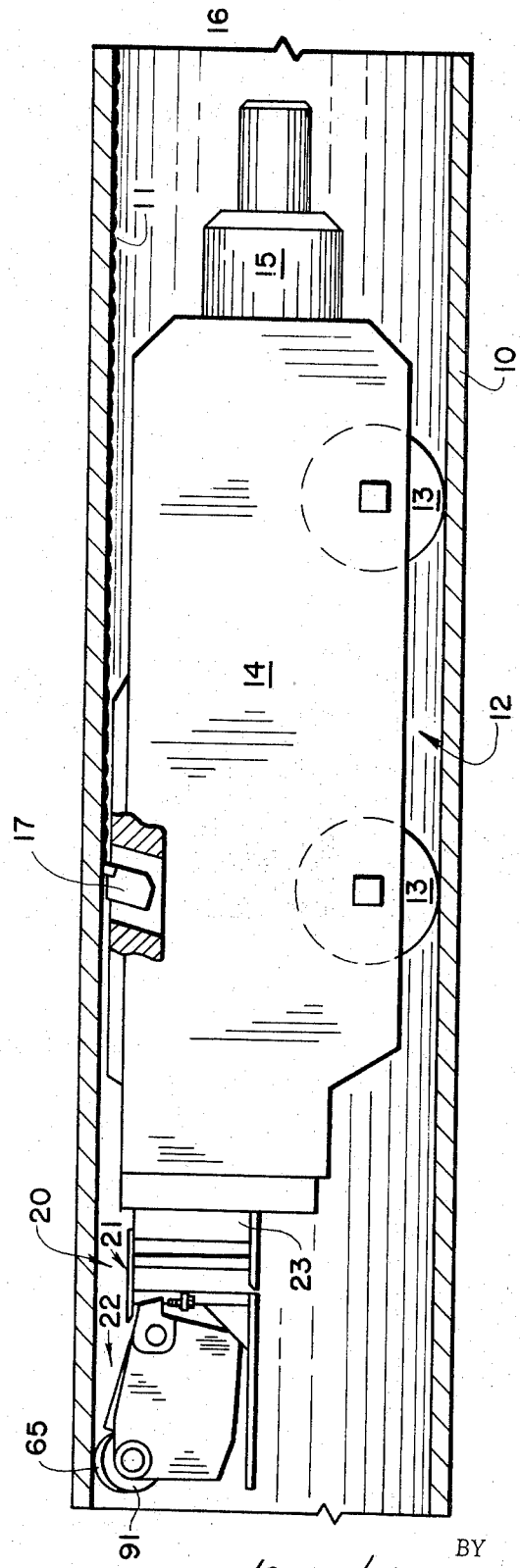
FIG. 1 is an elevational view, partially in section, illustrating the welding flash detector of the present invention being located behind the flash cutter inside a pipe to monitor the trim of welding flash from a weld seam extending longitudinally of the pipe.

Referring to FIG. 1, a conduit or pipe is shown generally at 10. The pipe 10 has been formed with a longitudinally extending weld seam, and welding flash indicated generally by the numeral 11 depends into the pipe 10 along the weld seam.

In order to trim the welding flash 11 from the interior of the pipe 10, a cutting head shown generally at 12 is disposed within the pipe 10. A plurality of rollers, two of which are shown at 13, support the head from the interior wall of the pipe 10. The cutting head includes a housing 14 having a connector 15 secured to its forward end. The connector 15 attaches the housing to a mandrel, not shown, which may be used to position the head 12 inside the pipe 10.

A cutting tool 17 is carried by the head 12. The cutting tool 17 is adjustable in a direction transverse to the direction of movement of the pipe 10 by remotely controlled positioning means, not shown, disposed within the housing 14. When the cutting tool 17 is properly adjusted it will trim the welding flash 11 from the interior of the pipe 10 as the pipe moves over the cutting head 12.

In order to inspect the trimmed weld, a detector indicated generally by the numeral 20, is mounted on the trailing end of the housing 14. The detector comprises a support assembly indicated generally by the numeral 21, and a sensing head indicated generally by the numeral 22. As will be explained in greater detail, the support assembly 21 serves to support the sensing head 22 from the cutting head while providing the sensing head 22 with substantial freedom of movement relative to the cutting mandrel. By this arrangement, the sensing head 22 may accurately follow the cut formed in the work-piece independent of the movement of the cutting head 12.

Figure 3:
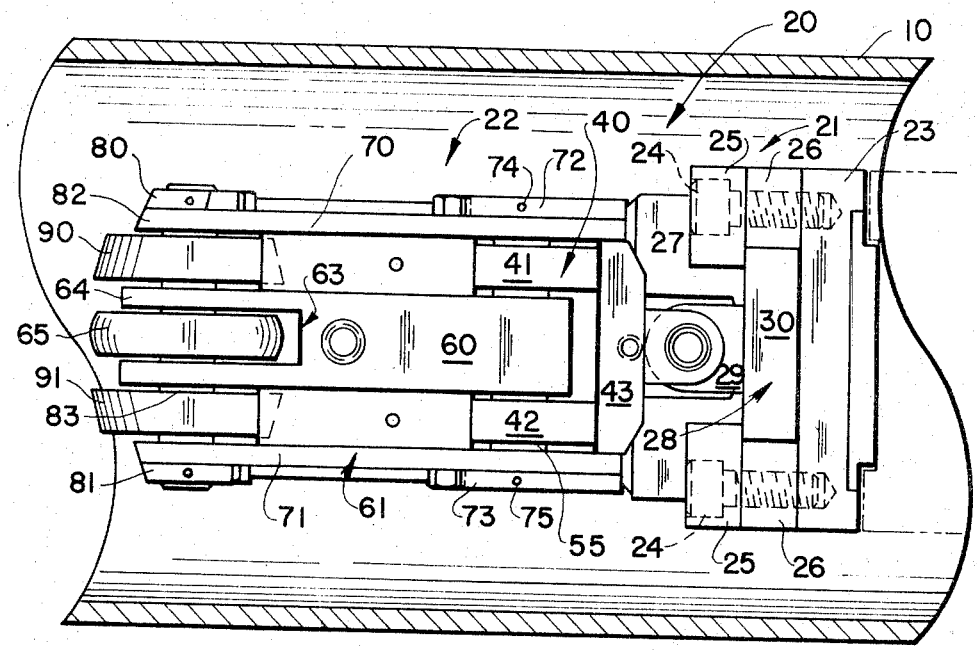
FIG. 3 is a sectional view of the detector as seen from the plane indicated by the line 3—3 in FIG. 2.
Figure 2:
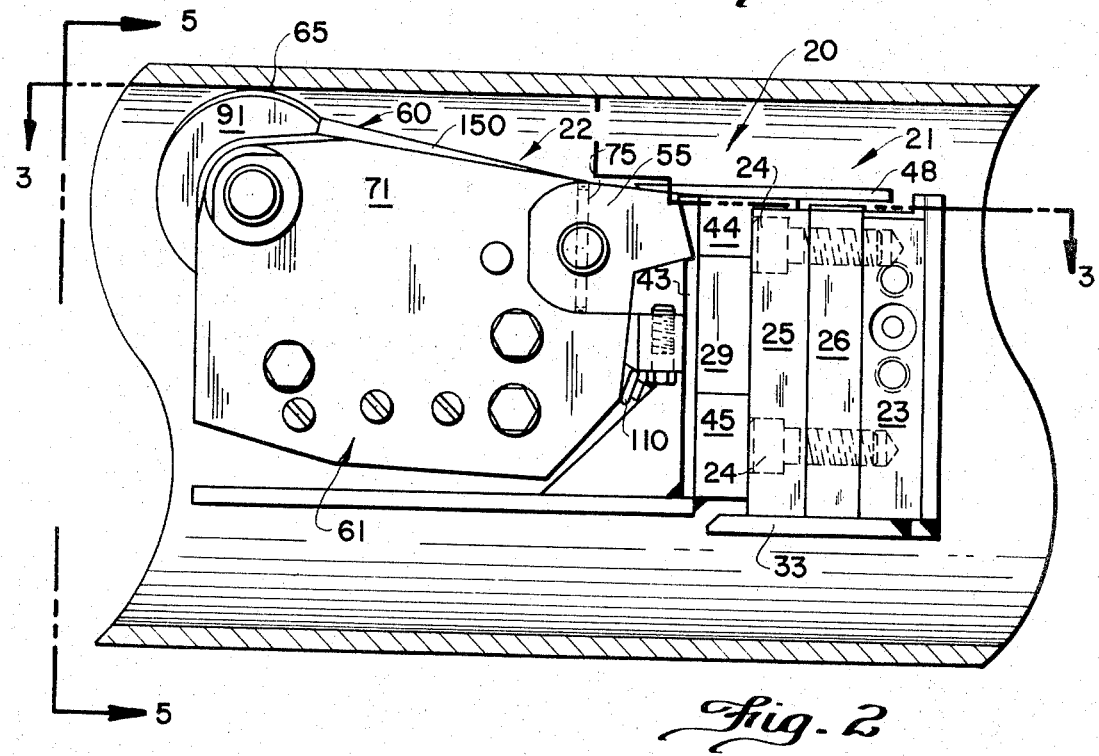
FIG. 2 is an enlarged elevational view partially in section showing the detector which is mounted on the cutting mandrel.

A mounting plate 23 is carried by the trailing end of the housing 14. The support assembly 21 is secured to the mounting plate 23 by means of four cap screws 24, as seen in FIGS. 2 and 3. The heads of the cap screws 24 are seated within a pair of bearing plates 25. A pair of spacer plates 26 are clamped between the bearing plates 25 and the mounting plate 23. The spacer plates 26 are of a width which is less than the width of the bearing plates 25 such that a T-shaped channel 27 is defined by the inwardly facing surfaces of the plates 25, 26, 23.

A T-shaped mounting member 28 includes a rearwardly projecting mounting tongue 29 welded to a supporting plate 30. The supporting plate 30 is slip-fitted within the T-shaped channel 27 such that the mounting member 28 may move to a limited degree relative to the bearing plate 23.

Referring to FIG. 4, the supporting plate 30 has a downwardly facing aperture 31 formed adjacent its lower surface. A ball bearing 32 is carried within the aperture 31. A rearwardly extending lower shield plate 33 is welded to the lower surface of the mounting plate 23 and provides an upwardly facing bearing surface 34. The ball bearing 32 engages the bearing surface 34 and thereby supports the mounting member 28 for angular movement within the T-shaped slot 27.

Referring to FIG. 3, a double-yoke structure 40 includes a pair of spaced rearwardly extending legs 41, 42 cantilevered from a transversely extending cross member 43. Referring to FIGS. 2 and 4, a pair of forwardly extending legs 44, 45 are also cantilevered from the cross member 43. The forwardly extending legs 44, 45 extend on opposite sides of the mounting tongue 29 and journal the ends of a forward pivot shaft 46. The forward pivot shaft 46 extends intermediate its ends through a sleeve bearing 47 carried by the mounting tongue 29. An upper shield plate 48 is secured to the yoke structure 40 by means of screws 49. A similar screw 50 extends through the upper shield plate 48 and into a threaded aperture in the forward pivot shaft 46 to secure the shaft 46 in place.

Figure 5:
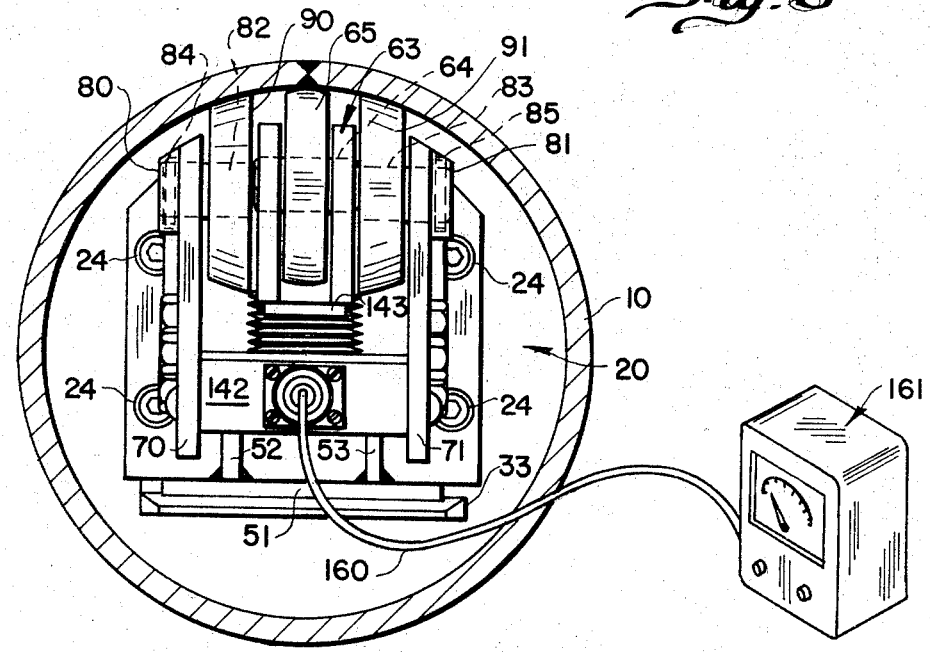
FIG. 5 is an end view of the detector as seen from the plane indicated by the line 5—5 in FIG. 2; and, FIG. 6 is a bottom sectional view of the detector as seen from the plane indicated by the line 6—6 in FIG. 4.

A sensing head shield 51 underlies the sensing head 22 and is welded to a pair of upstanding reinforcing plates 52, 53 as best seen in FIG. 5. The reinforcing plates are in turn, welded to the forwardly extending yoke leg 45. The shield 51 pivots with the yoke structure 40 to shield the sensing head 22 from beneath.

A rear pivot shaft 55 extends through the spaced yoke legs 41, 42 and serves to pivotally mount the sensing head 22 from the support assembly 21. A pair of sleeve bearings 56, 57 are carried by the yoke legs 41, 42 to pivotally engage the shaft 55, as seen in FIG. 6.

The sensing head 22, as seen in FIG. 3, includes a sensing arm 60 which is pivotally mounted on the rear pivot shaft 55 between the yoke legs 41, 42 and a reference unit generally indicated by the numeral 61 pivotally mounted from the outer ends of the rear pivot shaft 55.

Figure 6:
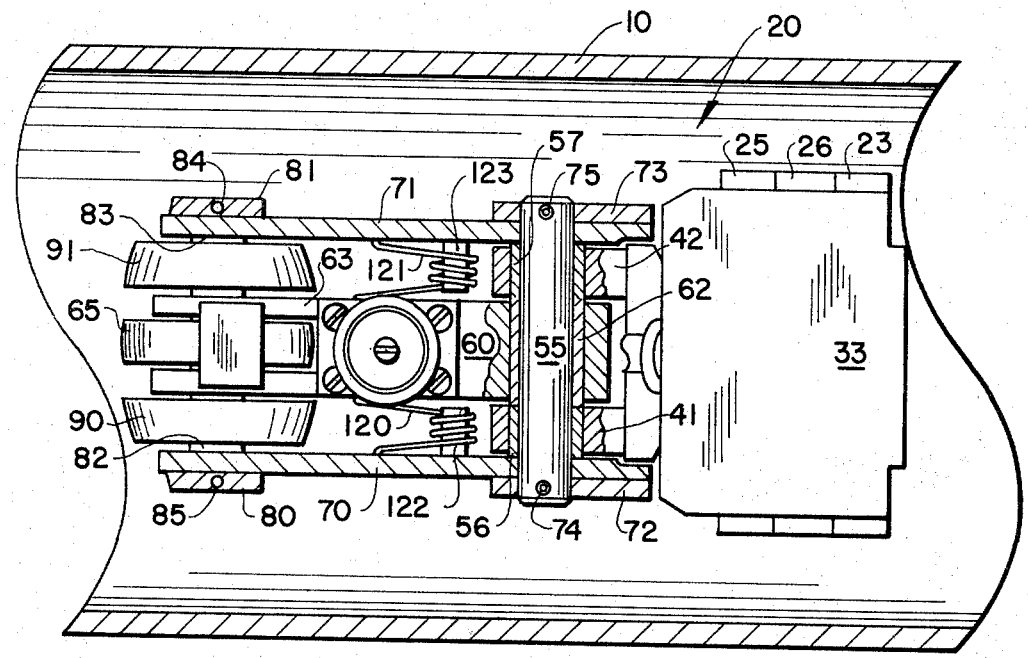

Referring to FIG. 6, the forward end of the sensing arm 60 carries a sleeve bearing 62 which pivotally engages the rear pivot shaft 55. The rear end of the sensing arm 60 includes a yoke 63 which journals a stub shaft 64. A sensing roller 65 is pivotally mounted on the stub shaft 64 intermediate the legs of the yoke 63. A ball bearing 66, shown only in FIG. 4, enables the roller 65 to rotate relative to the shaft 64 with a minimum of friction and wear.

The reference unit 61 includes a pair of side plates 70, 71. The ends of the rear pivot shaft 55 are journaled by the side plates 70, 71. A first pair of apertured collar plates 72, 73 are welded to the side plates 70, 71 and receive the ends of the pivot shaft 55. A pair of roll pins 74, 75 are driven into apertures formed in each of the collar plates 72, 73 and through apertures in the ends of shaft 55 to hold the shaft 55 in place.

A second pair of apertured collar plates 80, 81 are welded to the side plates 70, 71 adjacent the rear ends of the side plates. A pair of stub shafts 82, 83 extend through apertures in the side plates 70, 71 and through the apertured collar plates 80, 81. A pair of roll pins 84, 85 are driven into apertures in the collar plates and through apertures in the shafts 82, 83 to hold the shafts in place.

A pair of reference rollers 90, 91 are carried by the stub shafts 82, 83. As may be seen in FIG. 5, the reference rollers are positioned to engage the pipe 10 on either side of the weld track which is engaged by the sensing roller 65.

An adjustable biasing assembly indicated generally by the numeral 100 is provided to bias the reference unit clockwise, as seen in FIG. 4, and to bias the reference rollers 90, 91 into engagement with the inner wall of the pipe 10. The biasing assembly 100 includes a sleeve 101 which is received within an inclined aperture 102 in the yoke leg 45. An elongate rod 103 is slip-fitted coaxially within the sleeve 101. The rod 103 has a threaded end 104. A pivot block 105 has a threaded aperture 106 which receives the threaded end 104 to form a rigid connection. A pivot pin 107 extends through the pivot block 105.

The ends of the pivot pin 107 are journaled by the legs of a positioning yoke 108. The yoke 108 extends between the side plates 70, 71 and is welded thereto at its ends, not shown. By this arrangement, the positioning yoke 108 and the side plates 70, 71 comprise a rigid frame structure which pivots about the shaft 55 and carries the mechanism of the reference unit, as will be explained.

A threaded nut 109 is positioned on the threaded end 104 of the rod 103. Sandwiched between the nut 104 and the sleeve 101 is a compression spring 110, the ends of which are capped by a pair of lipped washers 11, 112. By adjusting the position of the nut 109 relative to the rod 103, the reference unit 61 may be rotated about the shaft 55 until the reference rollers 90, 91 are brought into engagement with the inner wall of the pipe 10. When the rollers 90, 91 are in engagement with the inner wall of the pipe 10, further adjustment of the nut 109 will serve to adjust the compression of the spring 110 and hence the biasing force with which the rollers 90, 91 are urged into contact with the pipe.

A pair of torsion springs 120, 121 best seen in FIG. 6, are wound about a pair of pins 122, 123 secured to the side plates 70, 71. One end of each of the springs 120, 121 engages the side walls 70, 71 and the other end engages the sensing arm 60. The springs 120, 121 serve to bias the sensing arm 60 clockwise as seen in FIG. 4 relative to the reference unit 61. The biasing force exerted by the springs 120, 121 is sufficient to assure that the sensing roller 65 will maintain engagement with the pipe 10 but is not so strong as to overcome the biasing force of the spring 110 which maintains the reference rollers 90, 91 and contact with the pipe. By the arrangement of compression 110 and torsion springs 120, 121 the compression spring 110 serves as a first biasing means to bias the rollers 90, 91 into engagement with the inner wall of the pipe 10 while the torsion springs 120, 121 serve as a second biasing means to bias the roller 65 into engagement with the workpiece track while permitting relative movement of the sensing roller 65 and the reference rollers 90, 91, in response to surface variations between the weld track and the interior pipe surfaces adjacent the weld track.

In order to develop an electrical signal having a value representative of the relative position of the sensing roller 65 and the reference rollers 90, 91, a transducer indicated generally by the numeral 130 is positioned between and connected to the sensing arm 60 and the reference unit 61. The transducer 130 includes a transducer coil 131 with an iron core 132 positioned therein such that relative movement between the core and coil will provide an electrical signal. The transducer coil 131 is secured rigidly to the reference unit 61 by a mounting block 133 which is welded to the pivot block 108.

The iron core 132 of the transducer 130 is coupled by a shaft 134 to a position adjusting assembly indicated generally at 135 carried by the sensing arm 60. The shaft 134 connects with a generally T-shaped member 136 which extends through a retaining plate 137. The retaining plate 137 is secured to the sensing arm 60 by means of suitable fasteners, not shown. A compression spring 138 is operative between the retaining plate 137 and the upper end of the T-shaped member 136 to bias the T-shaped member 136 away from the retaining plate 137. An adjustable set screw 139 is threaded through an aperture 140 in the sensing arm 60 such that its lower end engages the upper surface of the T-shaped member 136. Hence, by adjusting set screw 139, the position of the T-shaped member 136 and hence, the position of the iron core 132 relative to the sensing arm 60 may be adjusted.

In order to protect the transducer core 132 and shaft linkage 134 from foreign matter such as dirt and abrasives, a bellows structure 141 is provided to coaxially surround the core 132 and shaft linkage 134 in the region intermediate the coil 131 and the retaining plate 137.

A pair of coacting stop members 142, 143 are carried by the reference unit 61 and the sensing arm 60, respectively. The stop member 142 is welded between the side plates 70, 71. The stop member 143 extends between the legs of the yoke 63 and is likewise rigidly secured to the legs for movement therewith. The stops 142, 143 do not normally engage each other but rather serve to provide a safety means to protect the transducer 130 by preventing the core 132 from moving beyond a point that would cause damage to the coil 131.

A protective shield 150 is provided in the region above the sensing arm 60 to shield the sensing arm from welding flash being cut from the pipe 10 by the cutter 17. An aperture 151 provided through the shield 150 permits adjustment of the set screw 130 to accommodate different sizes of pipe.

Referring to FIG. 5, the electrical signal produced by the transducer 130 is fed by means of a cable 160 to an indicator unit 161 which may be positioned remotely from the detector 20.

In operation, the detector 20 is mounted behind the cutting head 12 with the pipe or conduit 10 travelling over it. The reference rollers 90, 91 are biased into engagement with the inside surface of the pipe 10 and thereby cause the transducer coil 131 to remain at a fixed position with respect to the inside surface of the pipe as the detector 20 is riding on the inside of the pipe. The reference rollers 90, 91 straddle the weld track while the sensing roller 65 rides along a track. The sensing roller 65 and sensing arm 60 are thereby caused to move relative to the reference rollers 90, 91 and the reference unit 61 in response to variations in the surface of the weld track. Hence the position of the iron core 132 relative to the coil 131 is likewise varied causing the transducer 130 to provide the indicator means 161 with a continuous signal indicative of the variations in the weld track relative to the interior wall of the pipe 10.

Although the invention has been described in its preferred form with a certain degree of particularity, it is understood that the present disclosure of the preferred form has been made only by way of example and that numerous changes and arrangement of parts may be resorted to without departing from the spirit and the scope of the invention as hereinafter claimed.

What is claimed is:

1. In combination with a welding flash cutter, a detector for sensing relative surface variations between surface portions of a trimmed weld seam and workpiece surface portions near the weld seam, the detector comprising:
   a. a sensing roller for engaging surface portions of a trimmed weld seam under inspection;
   b. a reference roller for engaging workpiece surface portions near the weld seam;
   c. a supporting structure mounting said rollers for movement relative to each other in directions generally transverse to the surface portions along which said rollers pass, and coupling said rollers to said cutter for movement therewith along the workpiece; and
   d. sensing means operably coupled to said rollers for sensing the relative position of said rollers and providing a signal indicative of the relative surface variations between the weld seam surface portions and the workpiece surface portions along which said rollers travel.

2. The combination of claim 1 wherein said reference and sensing rollers are of substantially the same diameter in order to be equally sensitive to surface variations in the respective surface portions over which they pass.

3. The combination of claim 1 wherein said supporting structure additionally includes biasing means biasing said rollers into contact with the respective surface portions over which they pass.

4. The combination of claim 1 wherein:

a. said supporting structure includes a sensing arm carrying said sensing roller and a reference unit carrying said reference roller;

b. said sensing arm is pivotally coupled to said reference unit for pivotal movement relative thereto; and c. said sensing means is connected between said sensing arm and said reference unit.

5. In combination with a welding flash cutter, a detector for sensing relative surface variations between surface portions of a trimmed weld seam and workpiece surface portions along both sides of the weld seam, the detector comprising:

a. a sensing roller for engaging surface portions of a trimmed weld seam under inspection;

b. a pair of reference rollers for engaging workpiece surface portions along opposite sides of the weld seam;

c. a supporting structure mounting said reference rollers for concurrent movement relative to said sensing roller in directions generally transverse to the surface portions along which said rollers pass, and coupling said rollers to said cutter for movement along the workpiece; and d. sensing means operably coupled to said reference rollers and said sensing roller for sensing the relative position of said sensing and reference rollers and for providing a signal indicative of the relative surface variations between the weld seam surface portions and the workpiece surface portions along which said rollers travel.

6. The combination of claim 5 wherein said reference and sensing rollers are of substantially the same diameter in order to be equally sensitive to surface variations in the respective surface portions over which they pass.

7. The combination of claim 5 wherein:

a. said supporting structure includes a sensing arm carrying said sensing roller and a reference unit carrying said reference rollers;

b. said sensing arm is pivotally coupled to said reference unit for pivotal movement relative thereto; and c. said sensing means is connected between said sensing arm and said reference unit.

8. A detector adapted to sense surface variations along a weld seam on the inner surface wall of a tubular conduit, the detector comprising:

a. a reference unit comprising a generally U-shaped frame member;

b. a pair of spaced reference rollers carried by said U-shaped frame member and adapted to be positioned one on each side of the weld seam under inspection to engage portions of the conduit adjacent the seam;

c. a sensing arm positioned between the legs of said U-shaped frame member;

d. a sensing roller carried by said sensing arm and positioned between said reference rollers to engage the weld seam under inspection;

e. biasing means biasing each of said rollers into engagement with the conduit; and f. sensing means connected between said sensing arm and said reference unit and adapted to provide a signal indicative of the relative position of said reference and sensing rollers;

g. whereby the signal provided by said sensing means is indicative of the surface variation between the weld seam and the adjacent portions of the conduit.

9. The detector of claim 8 wherein said sensing means comprises a transducer having an electrical coil mounted on said reference unit and a flux varying means coupled to said sensing arm and adapted to intercept a flux induced in said electrical coil to thereby vary the flux in accordance with relative positions of said sensing arm with respect to said reference unit.

10. The detector of claim 9 wherein said reference unit and said sensing arm are coaxially mounted for pivotal movement and the axes of rotation of said reference and sensing rollers are substantially axially aligned.

11. A method of sensing relative surface variations between surface portions along the interior of a length of tubular conduit between a trimmed weld seam extending longitudinally of the conduit and conduit wall portions to the side of the trimmed weld seam, comprising the steps of:

a. moving a first sensor along the trimmed weld seam, said sensor being adapted to follow the surface contour of the trimmed weld seam surface;

b. moving a second sensor in unison with said first sensor along conduit wall portions to the side of the trimmed weld seam, said second sensor being adapted to follow the surface contour of said wall portions and to sense surface contour variations of the same order of magnitude as said first sensor; and c. generating an electrical signal representive of the relative movement between said sensors as said sensors move through the conduit.

12. In combination with a welding flash cutter, a detector for sensing relative surface variations between surface portions of a trimmed weld seam and workpiece surface portions near the weld seam, the detector comprising:

a. a first sensor for engaging surface portions of a trimmed weld seam under inspection;

b. a second sensor for engaging workpiece surface portions near the weld seam;

c. a supporting structure mounting said sensors for movement relative to each other in directions generally transverse to the surface portions along which said sensors pass, and coupling said sensors to said cutter for movement therewith along the workpiece; and d. sensing means operably coupled to said sensors for sensing the relative position of said sensors and providing a signal indicative of the relative surface variations between the weld seam surface portions and the workpiece surface portions along which said sensors travel.

13. The combination of claim 12 wherein said sensors are equally sensitive to surface variations in the respective surface portions over which they pass.

14. The combination of claim 12 wherein said supporting structure additionally includes biasing means biasing said sensors into contact with the respective surface portions over which they pass.

15. The combination of claim 12 wherein:

a. said supporting structure includes a sensing arm carrying said first sensor and a reference unit carrying said second sensor;

b. said sensing arm is pivotally coupled to said reference unit for pivotal movement relative thereto; and
c. said sensing means is connected between said sensing arm and said reference unit.

16. A detector adapted to sense surface variations along a weld seam on the inner surface wall of a tubular conduit, the detector comprising:
   a. a reference unit comprising a generally U-shaped frame member;
   b. a pair of spaced reference sensors carried by said U-shaped frame member and adapted to be positioned one on each side of the weld seam under inspection to engage portions of the conduit adjacent the seam;
   c. a sensing arm positioned between the legs of said U-shaped frame member;
   d. a third sensor carried by said sensing arm and positioned between said reference sensors to engage the weld seam under inspection;
   e. biasing means biasing each of said sensors into engagement with the conduit; and
   f. sensing means connected between said sensing arm and said reference unit and adapted to provide a signal indicative of the relative position of said reference sensors and said third sensor;
   g. whereby the signal provided by said sensing means is indicative of the surface variation between the weld seam and the adjacent portions of the conduit.

17. The detector of claim 16 wherein said sensing means comprises a transducer having an electrical coil mounted on said reference unit and a flux varying means coupled to said sensing arm and adapted to intercept a flux induced in said electrical coil to thereby vary the flux in accordance with relative positions of said sensing arm with respect to said reference unit.

18. In combination with a welding flash cutter, a detector for sensing relative surface variations along a weld seam and workpiece surface portions along the weld seam, the detector comprising:
   a. a supporting structure connected to said cutter for movement therewith along a weld seam;
   b. a first sensor movably carried by said structure for engaging the weld seam under inspection;
   c. a pair of reference sensors positioned on opposite sides of said first sensor and movably carried by said supporting structure for engaging workpiece surface portions along paths on opposite sides of the weld seam; and
   d. sensing means operably coupled between said first sensor and said reference sensors for providing a signal indicative of the relative surface variations between the weld seam and said paths on opposite sides of said weld seam.

19. The detector of claim 18 wherein said sensors are all substantially equally sensitive to surface variations in the respective surface portions over which they pass.

20. A method of sensing relative surface variations between surface portions along the interior of a length of tubular conduit between a trimmed weld seam extending longitudinally of the conduit and conduit wall portions to the side of the trimmed weld seam, comprising the steps of:
   a. moving a first sensor along the trimmed weld seam, said sensor being adapted to follow the surface contour of the trimmed weld seam surface;
   b. moving second sensor in unison with said first sensor along conduit wall portions to the side of the trimmed weld seam; and
   c. generating an electrical signal representative of the relative movement between said sensors as said sensors move through the conduit.

21. The method of claim 20 wherein said sensors comprise rollers of substantially equal diameter whereby all of said sensors are equally sensitive to surface contour variations.

22. A method of sensing relative surface variations between surface portions along the interior of a length of tubular conduit between a trimmed weld seam extending longitudinally of the conduit and conduit wall portions on opposite sides of the trimmed weld seam, comprising the steps of:
   a. moving a first sensor along the trimmed weld seam, said first sensor being adapted to follow the surface contour of the tirmmed weld seam surface;
   b. moving second and third sensors in unison with said first sensor along conduit wall portions on opposite sides of the trimmed weld seam;
   c. generating an electrical signal representative of the relative movement between said sensors as said sensors move through the conduit.

23. The method of claim 22 wherein said sensors comprise rollers of substantially equal diameter whereby all of said sensors are equally sensitive to surface contour variations.

* * * * *